United States Patent [19]

Mihara

[11] Patent Number: 4,792,219

[45] Date of Patent: Dec. 20, 1988

[54] LARGE APERTURE LONG FOCUS MACRO LENS SYSTEM

[75] Inventor: Shin-ichi Mihara, Tokyo, Japan

[73] Assignee: Olympus Optical Co., Ltd., Tokyo, Japan

[21] Appl. No.: 885,647

[22] Filed: Jul. 15, 1986

[30] Foreign Application Priority Data

Jul. 18, 1985 [JP] Japan .................. 60-157052

[51] Int. Cl.$^4$ .............................. G02B 9/64
[52] U.S. Cl. .................................. 350/463
[58] Field of Search ............. 350/463, 428, 430, 450

[56] References Cited

U.S. PATENT DOCUMENTS 4,392,724 7/1983 Hamanishi ..................... 350/463

FOREIGN PATENT DOCUMENTS

55-28038 2/1980 Japan .
56-107210 8/1981 Japan .
57-192916 11/1982 Japan .
58-21221 2/1983 Japan .
59-152414 8/1984 Japan .

Primary Examiner—John K. Corbin
Assistant Examiner—Rebecca D. Gass
Attorney, Agent, or Firm—Cushman, Darby & Cushman

[57] ABSTRACT

A large aperture long focus macro lens system comprising a first lens group having positive refractive power, a stop, a second lens group having positive refractive power, and a third lens group in the order from the object side, the large aperture long focus marco lens system being arranged to be focused on an object at a short distance by advancing the lens system as a whole in the state that the first lens group, the stop and the second lens group are advanced integrally by varying the relative airspace in respect to the third lens group, the large aperture long focus macro lens system being arranged that aberrations are corrected favorably and the variation of aberrations at the time of focusing is small and that the working distance does not become short and the advancing amount of the lens system does not become large when focused on the object at a very short distance.

7 Claims, 10 Drawing Sheets

LARGE APERTURE LONG FOCUS MACRO LENS SYSTEM

BACKGROUND OF THE INVENTION (a) Field of the invention

The present invention relates to a large aperture long focus macro lens system.

(b) Description of the prior art

In case of lens systems for photographic cameras in general, aberrations vary when the object distance is varied. Therefore, the range of photographable object distance is limited. When the infinite object distance is included, the range of photographable object distance of known lens systems for photographic cameras is generally limited to about 1/10 as the photographing magnification. Some of known lens systems for photographic cameras are arranged to be capable of photographing up to the photographing magnification of ½ or 1 by using a so-called aberration correcting mechanism for short distance photographing (a mechanism for correction of aberrations when focusing on an object at a short distance) which is arranged to move some of lens components in order to correct the variation of aberrations to be caused at the time of focusing. However, said known lens systems have problems as shown under (a) to (g) below.

(a) The aperture ratio is small, i.e., about F/2.8 at the best.

(b) The telephoto ratio is large, i.e., larger than 1.4 in some cases, and the overall length of the lens system is long.

(c) The lens advancing amount for correction of aberrations at the time of focusing is extremely large, and this is not desirable from the view points of the structure of the lens mount and operability.

(d) The number of lenses constituting the lens system is large and, in some cases, it exceeds 10.

(e) In cases of some of said known lens systems, aberrations are not corrected satisfactorily favourably when focused on an object at a short distance.

(f) In cases of some of said known lens systems, the photographing magnification does not become higher than 1/5 though a very effective aberration correcting mechanism is provided.

(g) In cases of some of said known lens systems, the focal length of the lens system becomes short when the lenses are advanced for the purpose of focusing, and the working distance becomes short at the time of a high magnification.

It is considered that the causes of the above-mentioned problems are as explained below.

The problem (a) is caused due to the fact that it is difficult to correct the variation of spherical aberration and coma which occurs when the distance to the object (photographing magnification) is varied, and it is unavoidable to make the aperture ratio small (the F-number large) is order to cut off the portion where the variation of said aberrations is large.

The problem (b) occurs because it is advantageous for making the variation of aberrations small when refractive powers of respective lens groups are made small and, as a result, the telephoto ratio becomes large.

The problem (c) occurs because the variation of aberrations to be caused when focusing on an object at a short distance lens groups each having refractive power of a certain degree.

The problem (d) occurs because it is more advantageous for correction of aberrations when the number of lenses constituting the lens system is larger.

The problem (e) occurs owing to inadequate selection of lens configuraiton of the lens system, inadequate selection of a lens component to be moved for correction of aberrations when focusing on an object at a short distance, and inadequate amount of movement of said lens component.

The problem (f) occurs because the lens configuration of said lens component to be moved is not adequate.

The problem (g) occurs when the lens system consists of a front lens group having positive refractive power and a rear lens group having negative refractive power.

Regarding the above-mentioned problems, actual examples of lens systems are discussed below based on the known lens systems disclosed respectively in Japanese published unexamined patent applications Nos. 28038/80, 107210/81, 192916/82, 21221/83, 152414/84, etc.

Out of said known lens systems, the lens system disclosed in Japanese published unexamined patent application No. 28038/80 has the problems (a), (b), (c) and (e). The lens system disclosed in Japanese published unexamined patent application No. 107210/81 has very excellent performance and is capable of photographing up to the photographing magnification about 1. However, it has the problems (a), (b), (e) and (g). In case of the lens system disclosed in Japanese published unexamined patent application No. 192916/82, the problem (a) is solved satisfactorily. However, said known lens system has the problems (b), (c) and (e). Besides, there are two airspaces to be varied at the time of focusing and, therefore, the structure of the lens mount is complicated. The lens system disclosed in Japanese published unexamined patent application No. 21221/83 has the problem (f). The lens system disclosed in Japanese published unexamined patent application No. 152414/84 has the problems (b), (c) and (g) which should be solved. Out of them, the problems (b) and (c) are considerably detrimental to a semi-telephoto lens system with the focal length about 90 mm to 100 mm from the view points of the structure of the lens mount, size of the lens system and operability. As for the problem (g), the focal length of the lens system becomes short when focused on an object at a very short distance. As a result, the working distance becomes short or the perspective effect is lost at that time, and this is contrary to the object to be attained by arranging the lens system as a semi-telephoto lens system.

SUMMARY OF THE INVENTION

It is, therefore, a primary object of the present invention to provide a large aperture long focus macro lens system having an aberration correcting mechanism for short distance photographing (a mechanism for correction of aberrations when focusing on an object at a short distance) and arranged that the advancing amount of the lens system at the time of focusing is approximately equal to the product of the focal length and magnification, the focal length does not become short at the time of a high magnification, the aperture ratio is large, i.e., F/2.0 the lens system.is arranged compactly, i.e., the telephoto ratio is 1.25 or less and, moreover, the variation of aberrations is extremely small when focusing on an object at the infinite distance up to an object at a short distance with the photographing magnification about ½, said large aperture long focus macro lens system being thus arranged to have high performance.

The large aperture long focus macro lens system according to the present invention is arranged to have the lens composition as described below in order to solve the afore-mentioned problems. That is, the large aperture long focus macro lens system according to the present invention comprises, in the order from the object side, a first lens group I having positive refractive power, a stop, a second lens group II having positive refractive power and a third lens group III said large aperture long focus macro lens system being arranged to advance the lens system as a whole, when focusing on an object at a short distnace, in the state that the first lens group I, the stop, and the second lens group II are advanced integrally at the same time as varying the relative airspace in respect to the third lens group III, said large aperture long focus macro lens system being further arranged to fulfill the following conditions:

(1) $-0.4\phi < \phi_{III} < 0.4\phi$
(2) $0.33 < (\Delta_{12} - \Delta_3)/\Delta_{12} < 0.85 (\Delta_3 > 0)$
(3) $0.70\phi < \phi_A < 1.8\phi$
(4) $0.60\phi < -\phi_B < 1.7$
(5) $n_A > n_B$ where, reference symbol $\phi$ represents the refractive power (the reciprocal of the focal length) of the lens system as a whole, reference symbol $\phi_{III}$ represents the refractive power (the reciprocal of the focal length) of the third lens group III, reference symbols $\phi_A$ and $n_A$ respectively represent the refractive power and refractive index of a positive lens having the strongest refractive power out of the positive lenses in the third lens group III, reference symbols $\phi_B$ and $n_B$ respectively represent the refractive power and refractive index of a negative lens having the strongest refractive power out of the negative lenses in the third lens group III, reference symbol $\Delta_{12}$ represents the advancing amount of the first lens group I, the stop and the second lens group II, and reference sybmol $\Delta_3$ represents the advancing amount of the third lens group III.

A feature of the lens composition of the large aperture long focus macro lens system according to the present invention is that the third lens group III, which has a long focal length, i.e., more than twice the focal length of the lens system as a whole, and comprises at least one positive lens with a comparatively strong refractive power and at least one negative lens with a comparatively strong refractive power, is arranged on the image side of a modified Gauss type subsystem which is composed of the first lens group I, the stop and the second lens group II and which comprises six or seven lenses. Besides, the large aperture long focus macro lens system according to the present invention is arranged to be focused on an object at a short distance by advancing the lens system as a whole by increasing the airspace between the second lens group II and the third lens group III.

A primary object of the present invention is to provide a lens system for 35 mm single-lens reflex cameras which is capable of photographing an object at the infinite distance up to an object at a short distance where the photographing magnification is ½ and which has a sufficient working distance and high performance.

As an effective means for obtaining a lens system which has a large aperture ratio, wide range of available photographing magnification and high perfprmance, it is known to use an aberration correcting mechanism for short distance photographing (floating). However, in case of a known focusing method to advance the lens system as a whole by increasing an airspace between a positive lens group and another positive lens group which is adopted in the known lens systems, the advancing amount of the lens system becomes large though said known focusing method is advantageous for improving the performance of the lens system.

On the other hand, in case of a known focusing method to advance the lens system as a whole by increasing an airspace between a positive lens group and a negative lens group which is also adopted in the known lens systems, it is difficult to correct aberrations though said known focusing method is preferale for making the advancing amount of the lens system small. Moreover, when the lens system is focused on an object at a short distance, the focal length of the lens system becomes short and, consequently, the working distance also becomes short.

The large aperture long focus macro lens system according to the present invention is arranged to be focused on an object at a short distance and, at the same time, to correct aberrations favourably by advancing the lens system as a whole at the same time as increasing the airspace between the subsystem, which comprises the first lens group I and the second lens group II and has positive refractive power, and the third lens group III whose refractive power is extremely weak. Besides, for the airspace between the second lens group II and the third lens group III, it is not easy to obtain high accuracy in the dimension from the view point of the structure of the lens mount and, therefore, said subsystem having posiitve refractive power is arranged in the modified Gauss type so that aberrations of said subsystem itself can be favourably corrected to some extent. Furthermore, the third lens group III whose refractive power is extremely weak as mentioned in the above is arranged on the image side of said subsystem so that aberrations of the lens system as a whole are corrected almost perfectly when focused on an object at the infinite distance. For the above-mentioned purpose, the third lens group III is arranged to comprise at least one positive lens with a comparatively strong refractive power and at least one negative lens with a comparatively strong refractive power. Moreover, to arrange that variation of aberrations will not occur when focusing on an object at a short distance, the lens system according to the present invention is arranged to be focused by advancing the third lens group III at a speed lower than the advancing speed of the modified Gauss type subsystem (the first lens group I and the second lens group II). Furthermore, the large aperture long focus macro lens system according to the present invention is arranged to fulfill the afore-mentioned conditions (1) through (5) so as to thereby make it possible to attain the object of the present invention.

The condition (1) defines the refractive power of the third lens group III. If $\phi_{III}$ is made smaller than the lower limit of the condition (1), the working distance becomes short when focusing on an object at a very short distance, and this is contrary to the purpose to be achieved by using a long focus lens system. If $\phi_{III}$ is made larger than the upper limit of the condition (1), the advancing amount of the lens system at the time of focusing increases, and this is not desirable.

The condition (2) defines the ratio $\alpha(=(\Delta_{12}-\Delta_3)/\Delta_{12})$ of the increment $(\Delta_{12}-\Delta_3)$ of the airspace between the second lens group II and the third lens group III in respect to the advancing amount $\Delta_{12}$ of the subsystem (the first lens group I and the second lens group II). When $\alpha=0$, i.e., when the lens, system as a whole is advanced integrally, spherical aberration of the third order becomes negative, coma of the third order becomes considerably positive, and astigmatism of the third order becomes somewhat negative. As a result, aberrations do not become favourable when focused on an object at a short distnace. Therefore, $\alpha$ should be selected in the range of $0 < \alpha \leq 1$. When $\alpha = 1$, i.e., when the subsystem (the first lens group I and the second lens group II) is advanced by keeping the third lens group III fixed, it is advantageous from the view point of the structure of the lens mount. To suppress the variation of aberrations by arranging as $\alpha = 1$ as mentioned in the above, the action to correct the variation of aberrations to be caused when varying the airspace between the subsystem and the third lens group III may be made weak because $\alpha$ is large. Therefore, it is preferable to arrange that the refractive powers of respective lenses constituting the third lens group III are not strong. However, when the refractive powers of said lenses are weak, it is impossible to correct aberrations (especially, aberrations of the fifth order) as well as Petzval's sum satisfactorily favourably and, consequently, it is impossible to obtain a lens system with a large aperture ratio. In other words, it is impossible to correct aberrations as a whole satisfactorily favourably though it is possible to make the variation of aberrations small. On the other hand, when aberrations to be caused when focused on an object at a certain distance are corrected satisfactorily favourably, the variation of aberrations is liable to occur. Therefore, it is preferable to select $\alpha$ in the range of $0 < \alpha < 1$. In other words, it is preferable to arrange that the subsystem (the first lens group I and the second lens group II) is advanced and, at the same time, the third lens group III is also advanced at a speed lower than the advancing speed of the subsystem. Furthermore, when $\alpha$ is limited to the range of $0.33 < \alpha < 0.85$ as defined by the condition (2), it is possible to arrange that aberrations to be caused when focused on an object at a certain distance (for example, and object at the infinite distance) are corrected satisfactorily favourably and, at the same time, the variation of aberrations to be caused when focusing on an object at any other distance is minimized. If the condition (2) is not fulfilled, it is impossible to correct aberrations to be caused when focused on an object at a certain distance and, moreover, the variation of aberrations becomes large.

The conditions (3) and (4) respectively define the refractive power of a positive lens having the strongest refractive power out of the positive lenses in the third lens group III and the refractive power of a negative lens having the strongest refractive power out of the negative lenses in the third lens group III. If $\phi_A$ is made smaller than the lower limit of the condition (3) and/or $-\phi_B$ is made smaller than the lower limit of the condition (4), it is difficult to correct aberrations when focused on an object at a certain distance and, moreover, the action to correct the variation of aberrations becomes weak. If $\phi_A$ is made larger than the upper limit of the condition (3) and/or $-\phi_B$ is made larger than the upper limit of the coniition (4), aberrations of higher order are liable to occur when focused on an object at a certain distance and, it is difficult to maintain aberrations of higher order in the stable state because the variation of said aberrations of higher order also becomes large.

The condition (5) defined refractive indices of glass materials of a positive lens having the strongest refractive power out of the positive lenses in the third lens group III and of a negative lens having the strongest refractive power out of the negative lenses in the third lens group III. Petzval's sum of the lens system as a whole tends to become a large positive value, and the condition (5) is established in order to correct it. If the relation between $n_A$ and $n_B$ becomes $n_A < n_B$, Petzval's sum becomes a large positive value, and this is not desirable.

With the lens system according to the present invention, it is possible to obtain a more favourable large aperture long focus macro lens system when it is arranged that the first lens group I comprises, in the order from the object side, a positive lens, a thick positive meniscus lens which is convex toward the object side, and a negative meniscus lens which is convex toward the object side, the second lens group II comprises a negative lens having a concave surface with strong curvature on the object side, a positive lens having a convex surface on the image side, and a biconvex lens, and the lens system further fulfills the conditions (6) through (10) shown below:

(6) $0.6\phi < 1/r_5 < 1.5\phi$
(7) $0 < |1/r_9| < 1.3\phi$
(8) $0.1f < d_3 < 1.17$
(9) $0.14f < \Sigma D_{III} < 0.23f$
(10) $1.7 < n_6$ where, reference symbol f represents the focal length of the lens system as a whole, reference symbol $r_5$ represents the radius of curvature of the surface on the object side of the negative meniscus lens in the first lens group I, reference symbol $r_9$ represents the radius of curvature of the surface on the image side of the negative lens in the second lens group II, reference symbol $d_3$ represents the thickness of the thick positive meniscus lens in the first lens group I, reference symbol $\Sigma D_{III}$ represents the distance from the surface located on the extreme object side to the surface located on the extreme image side in the third lens group III, and reference symbol $n_6$ represents the refractive index of the positive lens arranged on the extreme image side in the second lens group II.

The condition (6) defines the radius of curvature of the surface on the object side of the negative meniscus lens in the first lens group I. When $1/r_5$ is made smaller than the lower limit of the condition (6), unfavourable influence occurs on offaxial aberrations (coma, astigmatism) and, moreover, variation of aberrations is liable to occur at the time of focusing. When $1/r_5$ is made larger than the upper limit of the condition (6), spherical aberration and chromatic aberration tend to be undercorrected and, moreover, the back focal length becomes very short.

The condition (7) defines the radius of curvature of the surface on the image side of the negative lens in the second lens group II. When $|1/r_9|$ is made smaller than the lower limit of the condition (7), spherical aberration and chromatic aberration tend to be undercorrected. When $|1/r_9|$ is made larger than the upper limit of the condition (7), unfavourable influence occurs on offaxial aberrations (coma, astigmatism) and, moreover, variation of aberrations is liable to occur at the time of focusing.

The condition (8) defines the thickness of the thick meniscus lens in the first lens group I. When $d_3$ is made smaller than the lower limit of the condition (8), spherical aberration for a short wavelength tends to become a large positive value even when spherical aberration for the standard wavelength is corrected favourably and, moreover, offaxial aberrations (coma, astigmatism) are liable to occur. When $d_3$ is made larger than the upper limit of the condition (8), it is advantageous for correction of aberrations. However, the overall length and weight of the lens system tend to become large, and this is not desirable.

The condition (9) defines the length of the third lens group III. The most ideal composition of said third lens group III is to arrange that a negative lens having the strongest refractive power out of the negative lenses in the third lens group III comes to a position on the extreme object side, a positive lens having the strongest refractive power out of the positive lenses in the third lens group III comes to a position on the extreme image side, and the distance between said two lenses becomes long. When so arranged, it is advantegeous for correction of aberrations (especially, aberrations of the fifth order). When $\Sigma D_{III}$ is made smaller than the lower limit of the condition (9), it is difficult to correct aberraitons. When $\Sigma D_{III}$ is made larger than the upper limit of the condition (9), the overall length of the lens system becomes long, and this is not preferable.

The condition (10) defines the refractive index of the glass material of the biconvex lens in the second lens group II. When said refractive index is the higher, it is the more advantageous for correction of Petzval's sum and spherical aberration of the lens system as a whole. When $n_6$ is made smaller than the lower limit of the condition (10), it is difficult to correct the above-mentioned aberrations.

DETAILED DESCRIPTION OF THE PREFERRED EMBODIMENT

Now, preferred embodiments of the large aperture long focus macro lens system according to the present invention described in Detail so far are shown below.

Embodiment 1
$r_1 = 61.8532$
   $d_1 = 7.5747$   $n_1 = 1.69680$   $\nu_1 = 55.52$
$r_2 = 532.6931$
   $d_2 = 0.1667$
$r_3 = 41.0347$
   $d_3 = 14.3074$   $n_2 = 1.72916$   $\nu_2 = 54.68$ -continued
$r_4 = 67.1244$
   $d_4 = 1.5356$
$r_5 = 107.3643$
   $d_5 = 3.7992$   $n_3 = 1.75520$   $\nu_3 = 27.51$
$r_6 = 26.5468$
   $d_6 = 11.1110$
$r_6 = \infty$ (stop)
   $d_7 = 8.4444$
$r_8 = -40.6335$
   $d_8 = 2.1034$   $n_4 = 1.59551$   $\nu_4 = 39.21$
$r_9 = -196.7001$
   $d_9 = 1.2222$
$r_{10} = -210.2130$
   $d_{10} = 6.5243$   $n_5 = 1.77250$   $\nu_5 = 49.66$
$r_{11} = -75.2851$
   $d_{11} = 0.1667$
$r_{12} = 94.4283$
   $d_{12} = 4.4446$   $n_6 = 1.77250$   $\nu_6 = 49.66$
$r_{13} = -145.0659$
   $d_{13} = 1.1446$
$r_{14} = -1186.8929$
   $d_{14} = 1.3334$   $n_7 = 1.51112$   $\nu_7 = 60.48$
$r_{15} = 59.0557$
   $d_{15} = 1.5361$
$r_{16} = 122.7515$
   $d_{16} = 2.9908$   $n_8 = 1.59270$   $\nu_8 = 35.29$
$r_{17} = 83.3012$
   $d_{17} = 2.2733$
$r_{18} = 106.2897$
   $d_{18} = 8.9957$   $n_9 = 1.62041$   $\nu_9 = 60.27$
$r_{19} = -103.6011$
   $f = 100, F/2.06, 2\omega = 27°$
   $1/\phi_{III} = 901.143, (\Delta_{12} - \Delta_3)/\Delta_{12} = 0.372$
   $1/\phi_A = 85.974, 1/\phi_B = -110.026$
   $n_A = n_9 = 1.62041, n_B = n_7 = 1.51112$
   $1/r_5 = 0.0093, 1/r_9 = -0.0051$
   $\Sigma D_{III} = 17.1293$
   (variation of distance $d_{13}$ when focused on an object at the short distance)

| $\infty$ | $\frac{1}{10}$ X | $\frac{1}{2}$ X |
|---|---|---|
| 1.145 | 4.428 | 19.385 |

Embodiment 2
$r_1 = 63.0681$
   $d_1 = 7.7252$   $n_1 = 1.69680$   $\nu_1 = 55.52$
$r_2 = 1276.2425$
   $d_2 = 0.1769$
$r_3 = 39.9136$
   $d_3 = 14.0998$   $n_2 = 1.72916$   $\nu_2 = 54.68$
$r_4 = 65.1451$
   $d_4 = 1.1111$
$r_5 = 108.4302$
   $d_5 = 3.8815$   $n_3 = 1.75520$   $\nu_3 = 27.51$
$r_6 = 26.3936$
   $d_6 = 8.8889$
$r_7 = \infty$ (stop)
   $d_7 = 6.6667$
$r_8 = -41.9502$
   $d_8 = 2.1258$   $n_4 = 1.59551$   $\nu_4 = 39.21$
$r_9 = -304.7574$
   $d_9 = 1.6111$
$r_{10} = -140.8520$
   $d_{10} = 5.3857$   $n_5 = 1.77250$   $\nu_5 = 49.66$
$r_{11} = -73.5940$
   $d_{11} = 0.1667$
$r_{12} = 105.0968$
   $d_{12} = 4.4445$   $n_6 = 1.77250$   $\nu_6 = 49.66$
$r_{13} = -110.1061$
   $d_{13} = 0.9515$
$r_{14} = -501.3638$
   $d_{14} = 1.9858$   $n_7 = 1.51633$   $\nu_7 = 64.15$
$r_{15} = 53.7064$
   $d_{15} = 2.8756$
$r_{16} = 127.6710$
   $d_{16} = 3.3333$   $n_8 = 1.67270$   $\nu_8 = 32.10$
$r_{17} = 85.6474$
   $d_{17} = 2.8667$
$r_{18} = 74.4577$
   $d_{18} = 9.4470$   $n_9 = 1.65160$   $\nu_9 = 58.52$ -continued $r_{19} = -129.1349$
$f = 100, F/2.06, 2\omega = 27°$
$1/\phi_{III} = 617.347, (\Delta_{12} - \Delta_3)/\Delta_{12} = 0.580$
$1/\phi_A = 73.830, 1/\phi_B = -93.837$
$n_A = n_9 = 1.65160, n_B = n_7 = 1.51633$
$1/r_5 = 0.0092, 1/r_9 = -0.0033$
$\Sigma D_{III} = 20.5084$
(variation of distance $d_{13}$ when focused on an object at the short distance)

| $\infty$ | $\frac{1}{10}$ X | $\frac{1}{2}$ X |
|---|---|---|
| 0.952 | 6.807 | 29.028 |

Embodiment 3

| | | |
|---|---|---|
| $r_1 = 58.7838$ | | |
| $d_1 = 7.7996$ | $n_1 = 1.69680$ | $\nu_1 = 55.52$ |
| $r_2 = 1041.9554$ | | |
| $d_2 = 0.1167$ | | |
| $r_3 = 42.7287$ | | |
| $d_3 = 14.0103$ | $n_2 = 1.71300$ | $\nu_2 = 53.84$ |
| $r_4 = 76.1347$ | | |
| $d_4 = 1.2110$ | | |
| $r_5 = 156.5924$ | | |
| $d_5 = 3.8220$ | $n_3 = 1.74000$ | $\nu_3 = 28.29$ |
| $r_6 = 271.1363$ | | |
| $d_6 = 11.8882$ | | |
| $r_7 = \infty$ (stop) | | |
| $d_7 = 4.7775$ | | |
| $r_8 = -42.4410$ | | |
| $d_8 = 2.1221$ | $n_4 = 1.56732$ | $\nu_4 = 42.83$ |
| $r_9 = -532.6149$ | | |
| $d_9 = 2.0221$ | | |
| $r_{10} = -112.3871$ | | |
| $d_{10} = 4.9997$ | $n_5 = 1.74400$ | $\nu_5 = 44.73$ |
| $r_{11} = -63.3587$ | | |
| $d_{11} = 0.1667$ | | |
| $r_{12} = 85.5630$ | | |
| $d_{12} = 4.8331$ | $n_6 = 1.77250$ | $\nu_6 = 49.66$ |
| $r_{13} = -153.0026$ | | |
| $d_{13} = 0.8888$ | | |
| $r_{14} = -1087.1052$ | | |
| $d_{14} = 2.1110$ | $n_7 = 1.51742$ | $\nu_7 = 52.41$ |
| $r_{15} = 53.3337$ | | |
| $d_{15} = 3.6554$ | | |
| $r_{16} = 105.3986$ | | |
| $d_{16} = 3.3331$ | $n_8 = 1.69895$ | $\nu_8 = 30.12$ |
| $r_{17} = 70.6361$ | | |
| $d_{17} = 3.3554$ | | |
| $r_{18} = 70.5272$ | | |
| $d_{18} = 8.4995$ | $n_9 = 1.65160$ | $\nu_9 = 58.52$ |
| $r_{19} = -118.0057$ | | |

$f = 100, F/2.06, 2\omega = 27°$
$1/\phi_{III} = 390.625, (\Delta_{12} - \Delta_3)/\Delta_{12} = 0.370$
$1/\phi_A = 0.0145, 1/\phi_B = -0.0102$
$n_A = n_9 = 1.65160, n_B = n_7 = 1.51742$
$1/r_5 = 0.0064, 1/r_9 = -0.0019$
$\Sigma D_{III} = 21.153$
(variation of distance $d_{13}$ focused on an object at the short distance)

| $\infty$ | $\frac{1}{10}$ X | $\frac{1}{2}$ X |
|---|---|---|
| 0.889 | 5.283 | 20.277 |

In respective embodiments shown in the above, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

Figure 1:
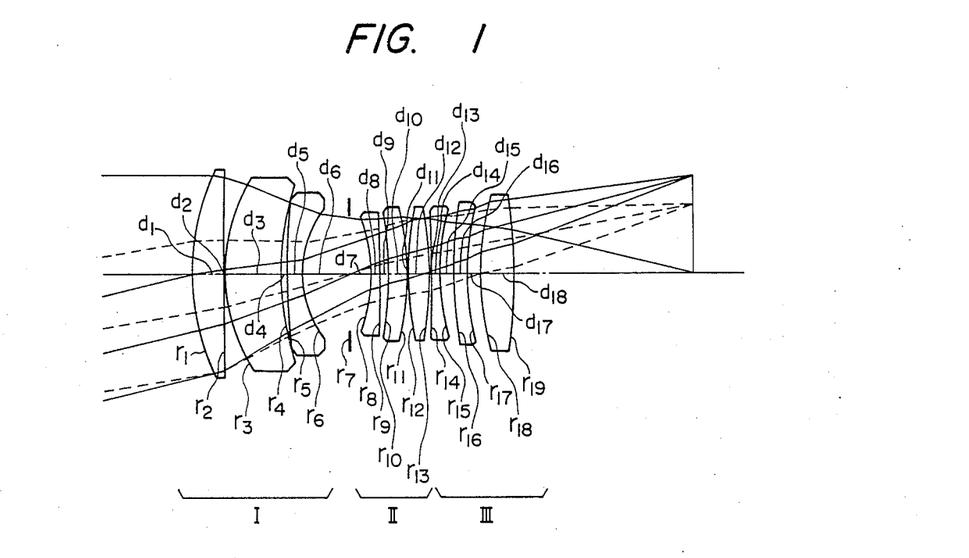
FIG. 1 shows a sectional view of an embodiment of the large aperture long focus macro lens system according to the present invention when focused on an object at the infinite distance.
Figure 2:
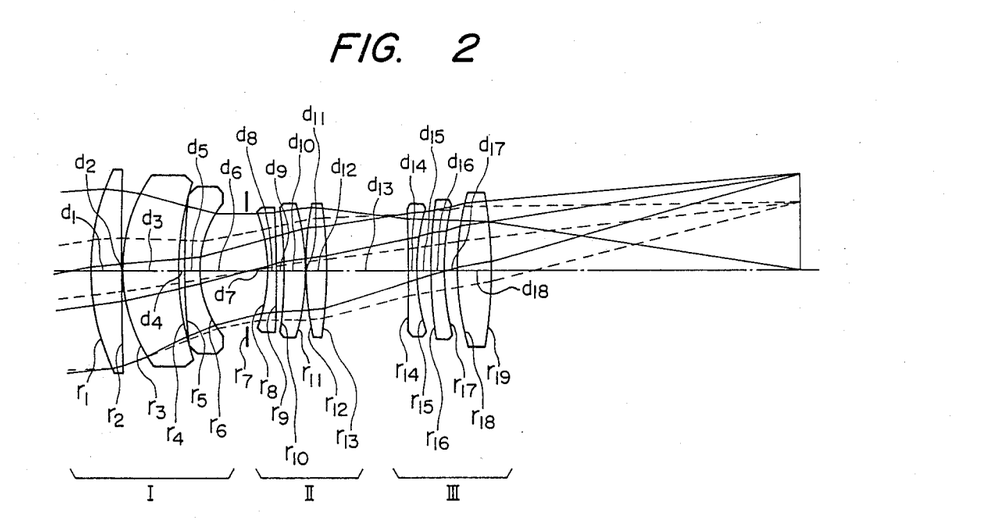
FIG. 2 shows a sectional view of an embodiment of said lens system according to the present invention when focused on an object at the shortest distance.

Respective embodiments shown in the above have the lens configuration as shown in FIG. 1 (when focused on an object at the infinite distance) and FIG. 2 (when focused on an object at the shortest distance).

Figure 3:
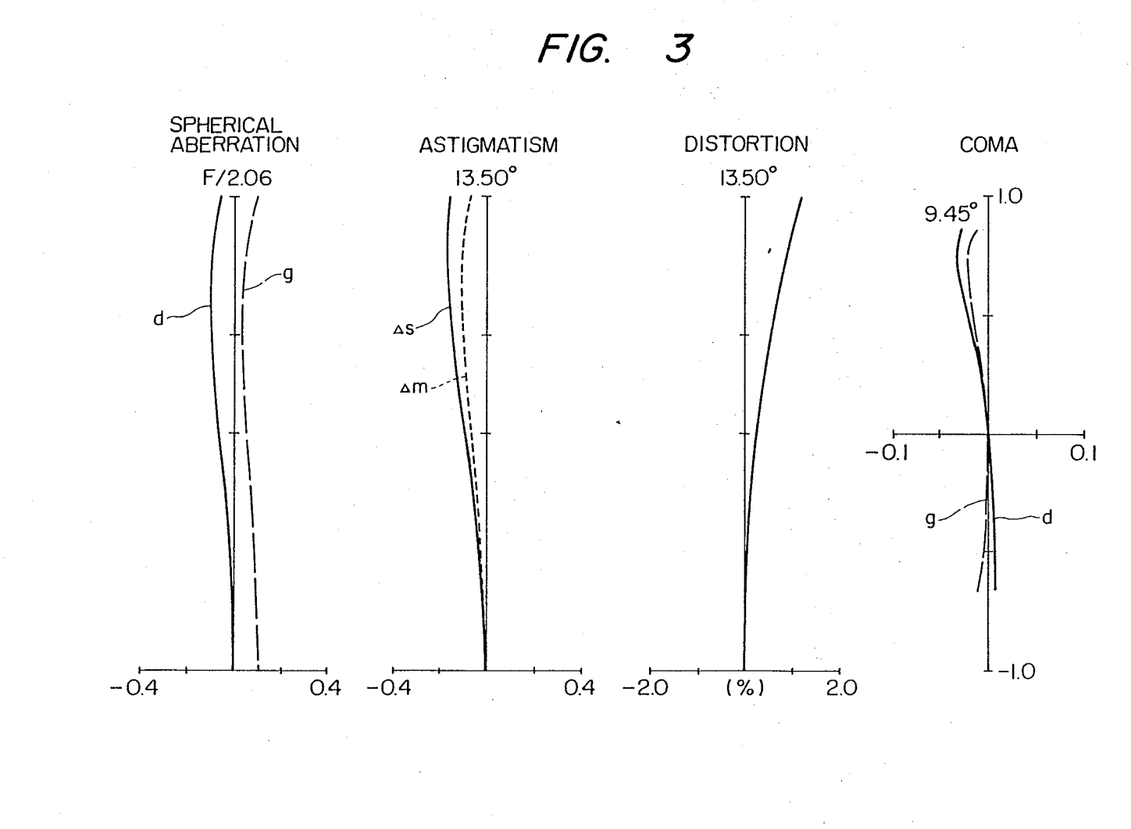
FIGS. 3 through 5 respectively show graphs illustrating aberration curves of Embodiment 1 of the present invention.
Figure 4:
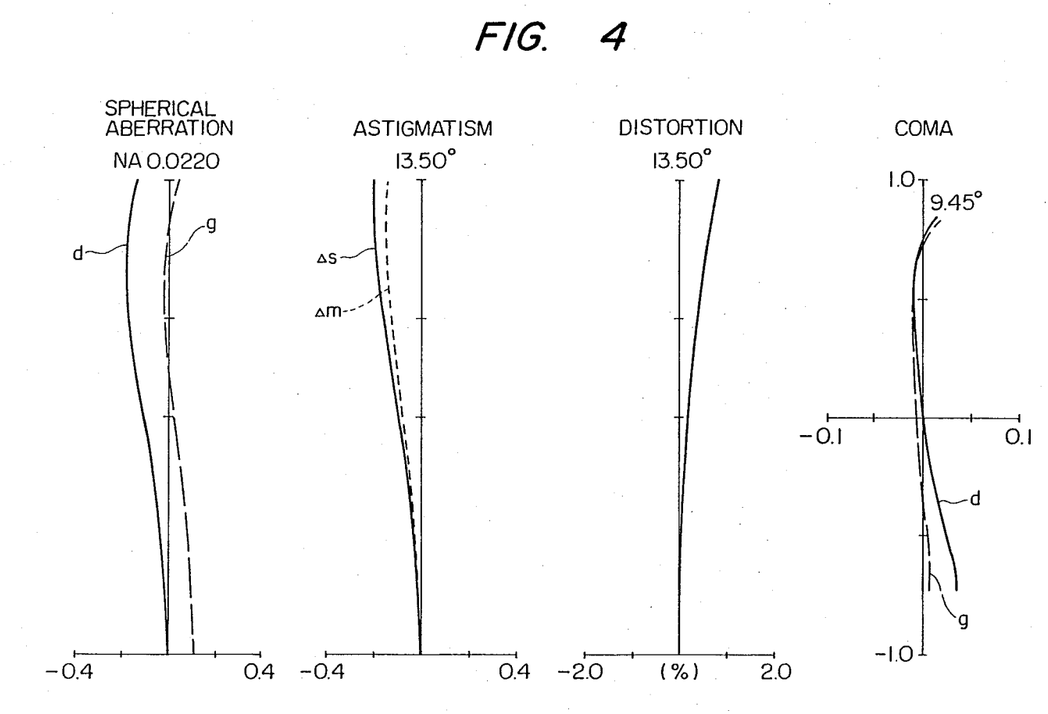
Figure 5:
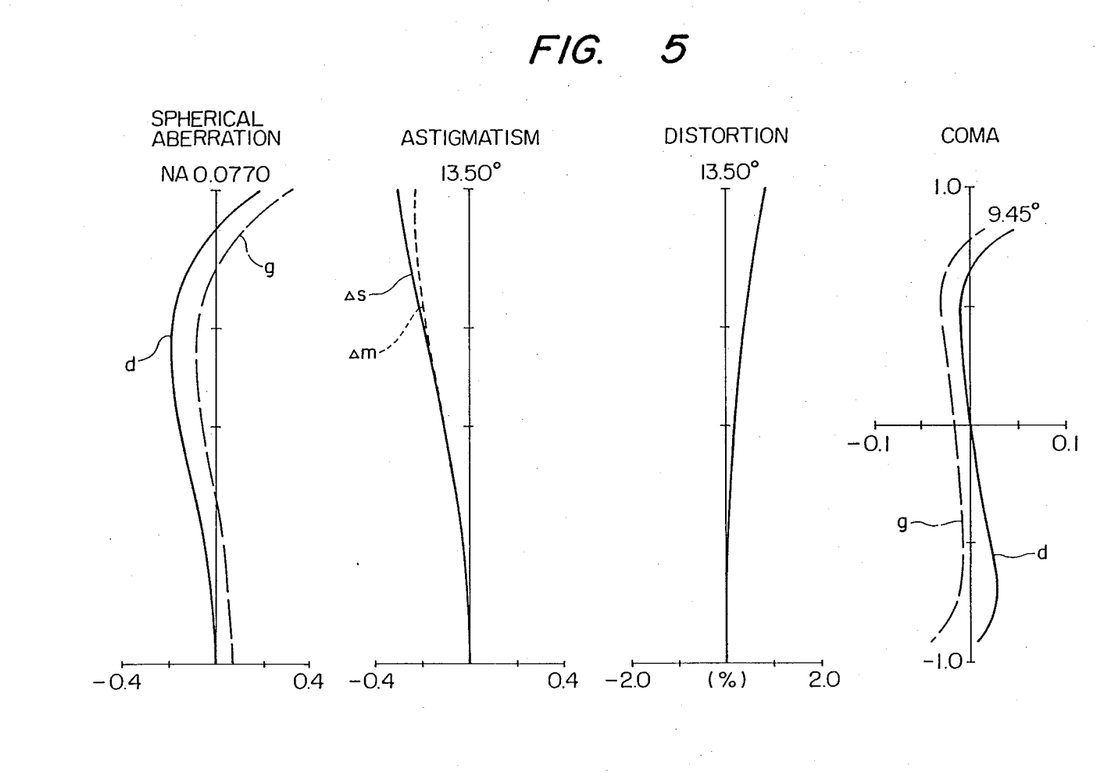
Figure 6:
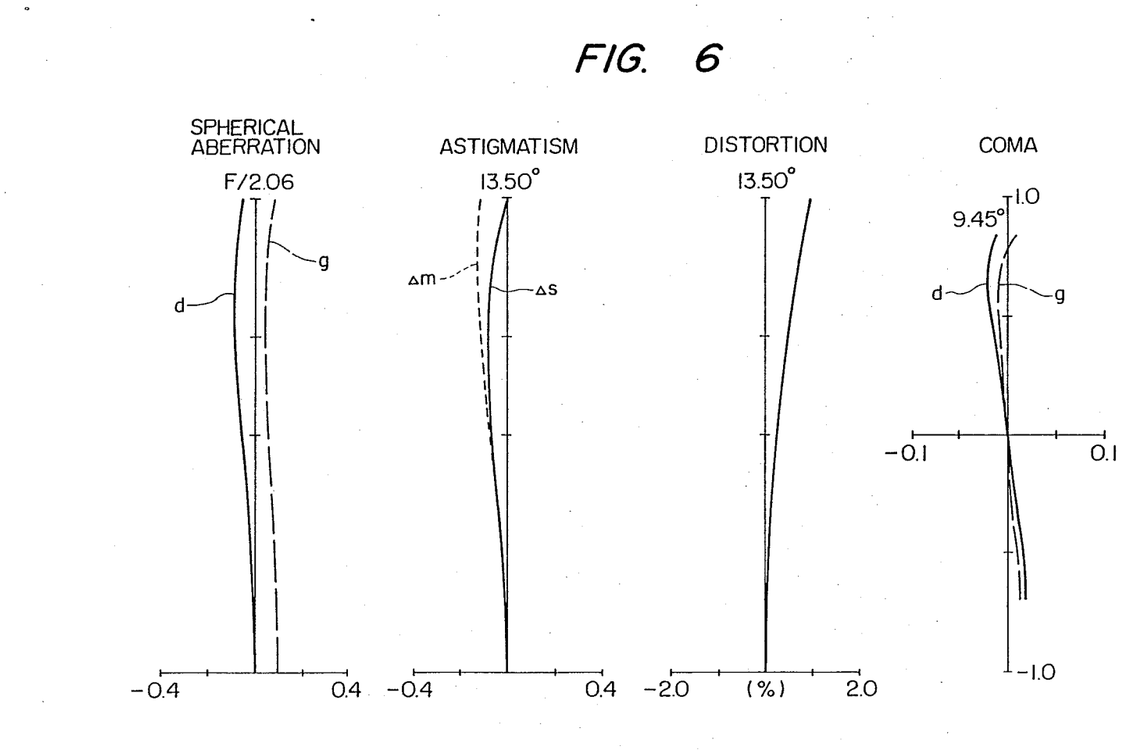
FIGS. 6 through 8 respectively show graphs illustrating aberration curves of Embodiment 2 of the present invention.
Figure 7:
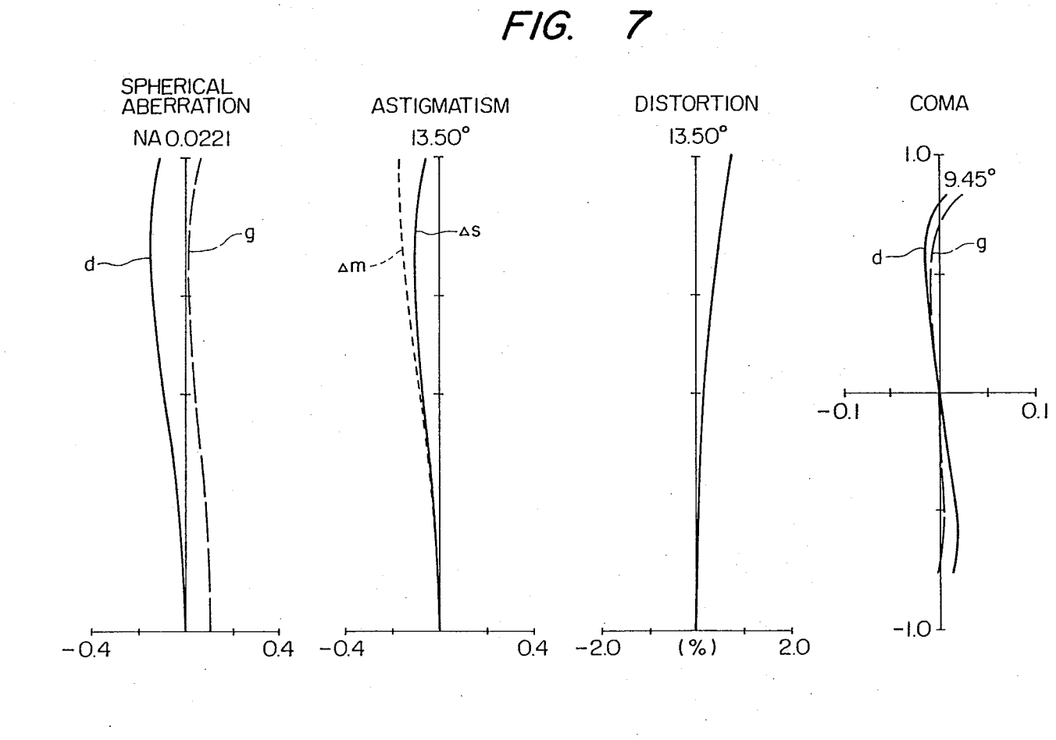
Figure 8:
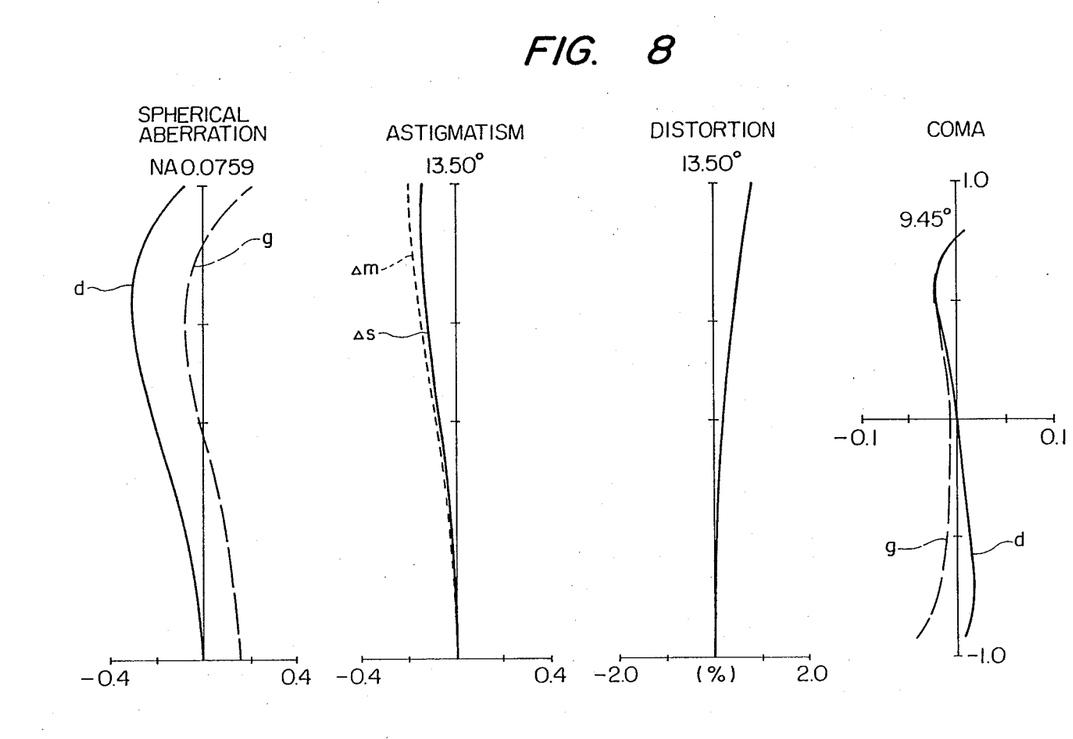
Figure 9:
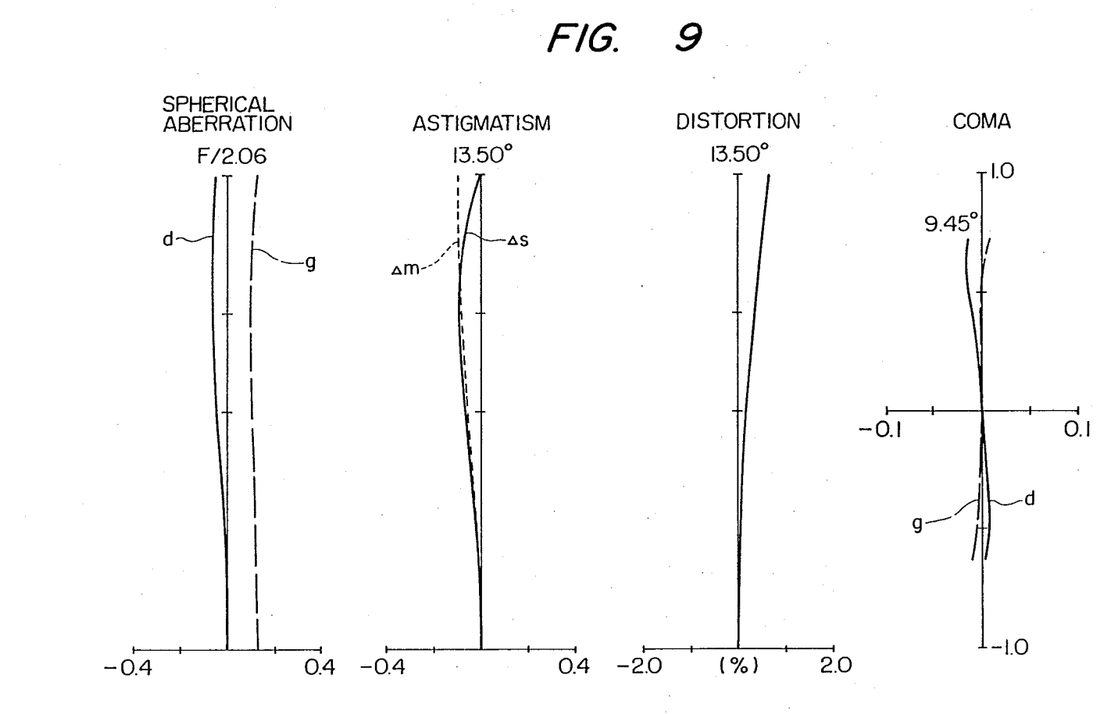
FIGS. 9 through 11 respectively show graphs illustrating aberration curves of Embodiment 3 of the present invention.
Figure 10:
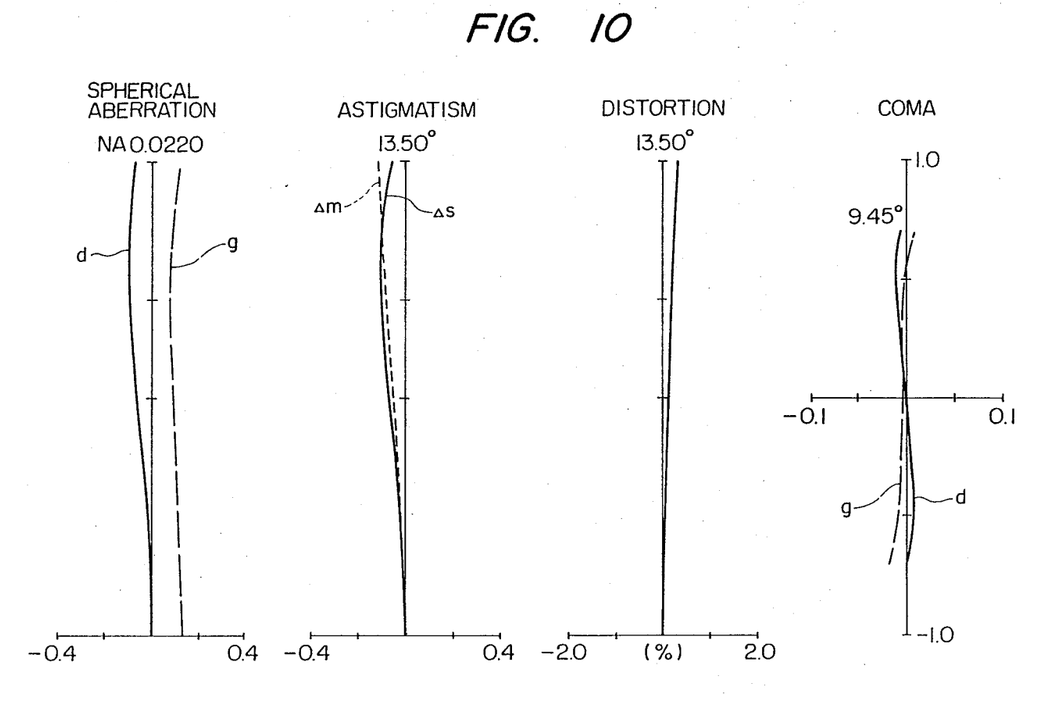
Figure 11:
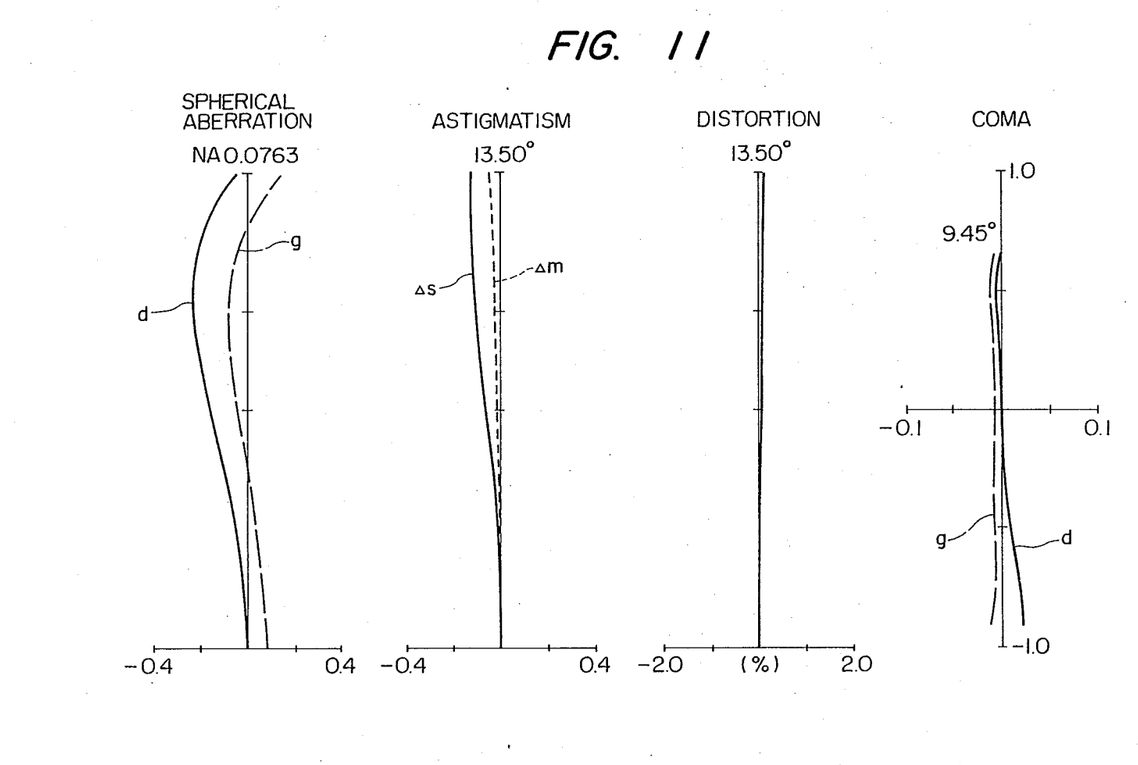

Graphs of aberration curves of said embodiments are as shown in FIGS. 3 through 11 wherein FIGS. 3 through 5 respectively show graphs of aberration curves of Embodiment 1 when focused on an object at the infinite distance, an object at the distance where the photographing magnification is 1/10, and an object at the distance where the photographing magnification is ½, FIGS. 6 through 8 respectively show graphs of aberration curves of Embodiment 2 when focused on an object at the infinite distance, an object at the distance where the photographing magnification is 1/10, and an object at the distance where the photographing magnification is ½, and FIGS. 9 through 11 respectively show graphs of aberration curves of Embodiment 3 when focused on an object at the infinite distance, an object at the distance where the photographing magnification is 1/10, and an object at the distance where the photographing distance is ½.

As described in detail so far, the large aperture long focus macro lens system according to the present invention is arranged that the variation of aberrations is small and aberrations are corrected extremely favourably over a wide range from an object at the infinite distance up to an object at the distance where the photographing magnification is ½, the advancing amount of the lens system when focusing is small in spite of the fact that an aberration correcting mechanism for short distance photographing is used, the working distance does not become short even when focused on an object at a very short distance, the aperture ratio is large, i.e., F/2.0, the overall length of the lens system is short, said large aperture lon focus macro lens system being further arranged to have high operability and high performance.

I claim:

1. A large aperture long focus-macro lens system comprising, in the order form the object side, a first lens group having positive refractive power as a whole, a stop, a second lens group having positive refractive power as a whole, and a third lens group, consisting of a negative lens unit and one biconvex lens, said large aperture long focus macro lens system being arranged to advance the lens system as a whole, when focusing on an object at a short distance, in the state that said first lens group, said stop and said second lens group are advanced integrally at the same time as varying the airspace in respect to said third lens group, said large aperture long focus macro lens system being further arranged to fulfill the conditions (1) through (5) shown below:

(1) $-0.4\phi < \phi_{III} < 0.4\phi$
(2) $0.33 < (\Delta_{12} - \Delta_3)/\Delta_{12} < 0.85 (\Delta_3 > 0)$
(3) $0.7\phi < \Delta_A < 1.8\phi$
(4) $0.6\Delta < -\phi_A < 1.7\phi$
(5) $n_A > n_B$ where, reference symbol $\phi$ represents the refractive power of the lens system as a whole, reference symbol $\phi_{III}$ represents the refractive power of the third lens group, reference symbol $\Delta_{12}$ represents the advancing amount of the first lens group, the stop and the second lens group, reference symbol $\Delta_3$ represents the advancing amount of the third lens group, reference symbol $\phi_A$ represents the refractive power of a positive lens in the third lens group, reference symbol $\phi_B$ represents the refractive power of a negative lens on the object side in the third lens group; reference symbol $n_A$ represents the refractive index of the positive lens in the third lens group, and references symbol $n_B$ represents the refractive index of the negative lens on the object side in the third lens group.

2. A large aperture long focus macro lens system according to claim 1, wherein said first lens group comprises, in the order from the object side, a positive lens, a thick positive meniscus lens having a convex surface on the object side, and a negative meniscus lens having a convex surface on the object side, said second lens group comprises a negative lens having a concave surface with strong curvature on the obejct side, a positive meniscus lens having a convex surface on the image side, and a biconvex lens, and said third lens group.

3. A large aperture long focus macro lens system according to claim 2 further fulfilling the condition (6) through (10) shown below:

(6) $0.6\phi < 1/r_5 < 1.5\phi$
(7) $0 < |1/r_9| < 1.3\phi$
(8) $0.1f < d_3 < 0.17f$
(9) $0.14f < \Sigma D_{III} < 0.23f$
(10) $1.7 < n_6$ where, reference symbol f represents the focal length of the lens system as a whole, reference symbol $r_5$ represents the radius of curvature of the surface on the object side of the negative meniscus lens in the first lens group, reference symbol $r_9$ represents the radius of curvature of the surface on the image side of the negative lens in the second lens group, reference symbol $d_3$ represents the thickness of the thick positive meniscus lens in the first lens group, reference symbol $\Sigma D_{III}$ represents the distance from the surface located on the extreme object side to the surface located on the extreme image side in the third lens group, and reference symbol $n_6$ represents the refractive index of the positive lens arranged on the extreme image side in the second lens group.

4. A large aperture long focus macro lens system according to claim 3 having the following numerical data:

| | | | |
|---|---|---|---|
| $r_1 = 61.8532$ | | | |
| | $d_1 = 7.5747$ | $n_1 = 1.69680$ | $\nu_1 = 55.52$ |
| $r_2 = 532.6931$ | | | |
| | $d_2 = 0.1667$ | | |
| $r_3 = 41.0347$ | | | |
| | $d_3 = 14.3074$ | $n_2 = 1.72916$ | $\nu_2 = 54.68$ |
| $r_4 = 67.1244$ | | | |
| | $d_4 = 1.5356$ | | |
| $r_5 = 107.3643$ | | | |
| | $d_5 = 3.7992$ | $n_3 = 1.75520$ | $\nu_3 = 27.51$ |
| $r_6 = 26.5468$ | | | |
| | $d_6 = 11.1110$ | | |
| $r_7 = \infty$ (stop) | | | |
| | $d_7 = 8.4444$ | | |
| $r_8 = -40.6335$ | | | |
| | $d_8 = 2.1034$ | $n_4 = 1.59551$ | $\nu_4 = 39.21$ |
| $r_9 = -196.7001$ | | | |
| | $d_9 = 1.2222$ | | |
| $r_{10} = -210.2130$ | | | |
| | $d_{10} = 6.5243$ | $n_5 = 1.77250$ | $\nu_5 = 49.66$ |
| $r_{11} = -75.2851$ | | | |
| | $d_{11} = 0.1667$ | | |
| $r_{12} = 94.4283$ | | | |
| | $d_{12} = 4.4446$ | $n_6 = 1.77250$ | $\nu_6 = 49.66$ |
| $r_{13} = -145.0659$ | | | |
| | $d_{13} = 1.1446$ | | |
| $r_{14} = -1186.8929$ | | | |
| | $d_{14} = 1.3334$ | $n_7 = 1.51112$ | $\nu_7 = 60.48$ |
| $r_{15} = 59.0557$ | | | |
| | $d_{15} = 1.5361$ | | |
| $r_{16} = 122.7515$ | | | |
| | $d_{16} = 2.9908$ | $n_8 = 1.59270$ | $\nu_8 = 35.29$ |
| $r_{17} = 83.3012$ | | | |
| | $d_{17} = 2.2733$ | | |
| $r_{18} = 106.2897$ | | | |

-continued

| | | | |
|---|---|---|---|
| | $d_{18} = 8.9957$ | $n_9 = 1.62041$ | $\nu_9 = 60.27$ |
| $r_{19} = -103.6011$ | | | |

$f = 100, F/2.06, 2\omega = 27°$
$1/\phi_{III} = 901.143, (\Delta_{12} - \Delta_3)/\Delta_{12} = 0.372$
$1/\phi_A = 85.974, 1/\phi_B = -110.026$
$n_A = n_9 = 1.62041, n_B = n_7 = 1.51112$
$1/r_5 = 0.0093, 1/r_9 = -0.0051$
$\Sigma D_{III} = 17.1293$
(variation of distance $d_{13}$ when focused on an object at the short distance)

| $\infty$ | $\frac{1}{10} \times$ | $\frac{1}{2} \times$ |
|---|---|---|
| 1.145 | 4.428 | 19.385 | where, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

5. a large aperture long focus macro lens system according to claim 3 having the following numerical data:

| | | | |
|---|---|---|---|
| $r_1 = 63.0681$ | | | |
| | $d_1 = 7.7252$ | $n_1 = 1.69680$ | $\nu_1 = 55.52$ |
| $r_2 = 1276.2425$ | | | |
| | $d_2 = 0.1769$ | | |
| $r_3 = 39.9136$ | | | |
| | $d_3 = 14.0998$ | $n_2 = 1.72916$ | $\nu_2 = 54.68$ |
| $r_4 = 65.1451$ | | | |
| | $d_4 = 1.1111$ | | |
| $r_5 = 108.4302$ | | | |
| | $d_5 = 3.8815$ | $n_3 = 1.75520$ | $\nu_3 = 27.51$ |
| $r_6 = 26.3936$ | | | |
| | $d_6 = 8.8889$ | | |
| $r_7 = \infty$ (stop) | | | |
| | $d_7 = 6.6667$ | | |
| $r_8 = -41.9502$ | | | |
| | $d_8 = 2.1258$ | $n_4 = 1.59551$ | $\nu_4 = 39.21$ |
| $r_9 = -304.7574$ | | | |
| | $d_9 = 1.6111$ | | |
| $r_{10} = -140.8520$ | | | |
| | $d_{10} = 5.3857$ | $n_5 = 1.77250$ | $\nu_5 = 49.66$ |
| $r_{11} = -73.5940$ | | | |
| | $d_{11} = 0.1667$ | | |
| $r_{12} = 105.0968$ | | | |
| | $d_{12} = 4.4445$ | $n_6 = 1.77250$ | $\nu_6 = 49.66$ |
| $r_{13} = -110.1061$ | | | |
| | $d_{13} = 0.9515$ | | |
| $r_{14} = -501.3638$ | | | |
| | $d_{14} = 1.9858$ | $n_7 = 1.51633$ | $\nu_7 = 64.15$ |
| $r_{15} = 53.7064$ | | | |
| | $d_{15} = 2.8756$ | | |
| $r_{16} = 127.6710$ | | | |
| | $d_{16} = 3.3333$ | $n_8 = 1.67270$ | $\nu_8 = 32.10$ |
| $r_{17} = 85.6474$ | | | |
| | $d_{17} = 2.8667$ | | |
| $r_{18} = 74.4577$ | | | |
| | $d_{18} = 9.4470$ | $n_9 = 1.65160$ | $\nu_9 = 58.52$ |
| $r_{19} = -129.1349$ | | | |

$f = 100, F/2.06, 2\omega = 27°$
$1/\phi_{III} = 617.347, (\Delta_{12} - \Delta_3)/\Delta_{12} = 0.580$
$1/\phi_A = 73.830, 1/\phi_B = -93.837$
$n_A = n_9 = 1.65160, n_B = n_7 = 1.51633$
$1/r_5 = 0.0092, 1/r_9 = -0.0033$
$\Sigma D_{III} = 20.5084$
(variation of distance $d_{13}$ when focused on an object at the short distance)

| $\infty$ | $\frac{1}{10} \times$ | $\frac{1}{2} \times$ |
|---|---|---|

-continued

| | | |
|---|---|---|
| 0.952 | 6.807 | 29.028 | where, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

6. A large aperture long focus macro lens system according to claim 3 having the following numerical data:

$r_1 = 58.7838$
  $d_1 = 7.7996$   $n_1 = 1.69680$   $\nu_1 = 55.52$
$r_2 = 1041.9554$
  $d_2 = 0.1167$
$r_3 = 42.7287$
  $d_3 = 14.0103$   $n_2 = 1.71300$   $\nu_2 = 53.84$
$r_4 = 76.1347$
  $d_4 = 1.2110$
$r_5 = 156.5924$
  $d_5 = 3.8220$   $n_3 = 1.74000$   $\nu_3 = 28.29$
$r_6 = 271.1363$
  $d_6 = 11.8882$
$r_7 = \infty$ (stop)
  $d_7 = 4.7775$
$r_8 = -42.4410$
  $d_8 = 2.1221$   $n_4 = 1.56732$   $\nu_4 = 42.83$
$r_9 = -532.6149$
  $d_9 = 2.0221$
$r_{10} = -112.3871$
  $d_{10} = 4.9997$   $n_5 = 1.74400$   $\nu_5 = 44.73$
$r_{11} = -63.3587$
  $d_{11} = 0.1667$
$r_{12} = 85.5630$
  $d_{12} = 4.8331$   $n_6 = 1.77250$   $\nu_6 = 49.66$
$r_{13} = -153.0026$
  $d_{13} = 0.8888$
$r_{14} = -1087.1052$
  $d_{14} = 2.1110$   $n_7 = 1.51742$   $\nu_7 = 52.41$
$r_{15} = 53.3337$
  $d_{15} = 3.6554$
$r_{16} = 105.3986$
  $d_{16} = 3.3331$   $n_8 = 1.69895$   $\nu_8 = 30.12$
$r_{17} = 70.6361$
  $d_{17} = 3.3554$
$r_{18} = 70.5272$
  $d_{18} = 8.4995$   $n_9 = 1.65160$   $\nu_9 = 58.52$
$r_{19} = -118.0057$
  $f = 100$, F/2.06, $2\omega = 27°$
  $1/\phi_{III} = 390.625$, $(\Delta_{12} - \Delta_3)/\Delta_{12} = 0.370$
  $1/\phi_A = 0.0145$, $1/\phi_B = -0.0102$
  $n_A = n_9 = 1.65160$, $n_B = n_7 = 1.51742$
  $1/r_5 = 0.0064$, $1/r_9 = -0.0019$
  $\Sigma D_{III} = 21.153$
  (variation of distance $d_{13}$ focused on an object at the short distance)

| $\infty$ | $\dfrac{1}{10}$ X | $\dfrac{1}{2}$ X |
|---|---|---|
| 0.889 | 5.283 | 20.277 | where, reference symbols $r_1$ through $r_{19}$ respectively represent radii of curvature of respective lens surfaces, reference symbols $d_1$ through $d_{18}$ respectively represent thicknesses of respective lenses and airspaces between respective lenses, reference symbols $n_1$ through $n_9$ respectively represent refractive indices of respective lesnes, and reference symbols $\nu_1$ through $\nu_9$ respectively represent Abbe's numbers of respective lenses.

7. A large aperture long focus macro lens system according to claim 1, wherein a sub-system, which is composed said first lens group, said stop and said second lens group, consists of, in the order from the object side, two positive lenses, one negative lens, a stop, one negative lens and two positive lenses.

* * * * *